(12) United States Patent
Kohmoto

(10) Patent No.: US 7,411,868 B2
(45) Date of Patent: Aug. 12, 2008

(54) ESTIMATION OF TIME WITHIN UNTRUSTED TIME DEVICE DISCONNECTED FROM TRUSTED TIME DEVICE

(75) Inventor: Hisayuki Kohmoto, Yokohamashi (JP)

(73) Assignee: International Business Machines Corporation, Armonk, NY (US)

( * ) Notice: Subject to any disclaimer, the term of this patent is extended or adjusted under 35 U.S.C. 154(b) by 872 days.

(21) Appl. No.: 10/991,161

(22) Filed: Nov. 14, 2004

(65) Prior Publication Data

US 2006/0107042 A1    May 18, 2006

(51) Int. Cl.
G04B 47/00 (2006.01)
G04C 13/00 (2006.01)
H04L 9/00 (2006.01)
G06F 11/30 (2006.01)
G06F 15/173 (2006.01)
H04N 7/16 (2006.01)

(52) U.S. Cl. .................... 368/10; 368/46; 709/223; 713/178; 713/194; 713/400; 725/29; 725/151

(58) Field of Classification Search .................. 368/10, 368/46; 709/223, 248; 713/155, 158, 178, 713/194, 400; 725/29, 104, 139–142, 151
See application file for complete search history.

(56) References Cited

U.S. PATENT DOCUMENTS

| | | | |
|---|---|---|---|
| 5,619,247 A * | 4/1997 | Russo | 725/104 |
| 5,708,709 A | 1/1998 | Rose | |
| 5,775,994 A | 7/1998 | Hsu | |
| 5,925,127 A | 7/1999 | Ahmad | |
| 6,389,538 B1 | 5/2002 | Gruse et al. | |
| 7,010,263 B1 * | 3/2006 | Patsiokas | 455/3.02 |
| 7,233,787 B2 * | 6/2007 | Higuchi et al. | 455/14.1 |
| 7,310,810 B1 * | 12/2007 | Hamada et al. | 725/91 |
| 2003/0093530 A1 * | 5/2003 | Syed | 709/226 |
| 2004/0024688 A1 * | 2/2004 | Bi et al. | 705/37 |
| 2006/0080261 A1 * | 4/2006 | Christal | 705/52 |

FOREIGN PATENT DOCUMENTS

JP    2002-116694 A2    4/2002

* cited by examiner

Primary Examiner—Vit W Miska (57) ABSTRACT

Upon connecting to a trusted device, an untrusted device: (a) acquires a trusted current time; (b) stores an elapsed time; (c) determines an estimated current time; and, (d) stores a time difference between the estimated current time and an untrusted current time. The untrusted device (e) repeats (b)-(d) until turned off. Upon being turned on and able to connect to the trusted device, the untrusted device (f) repeats (a)-(e). Otherwise, it: (g) determines a temporary current time; and, (h) compares the estimated current time of (c) with the temporary current time. The untrusted device, (i) where the estimated current time of (c) is less than the temporary current time, sets an offline current time as the temporary current time, or, (j) where the estimated current time of (c) is greater than the temporary current time, sets the offline current time as the estimated current time of (c).

20 Claims, 7 Drawing Sheets

| | TRUSTED CURRENT TIME 302 | ELAPSED TIME 304 | ESTIMATED CURRENT TIME 306 | UNTRUSTED CURRENT TIME 308 | TIME DIFFERENCE 310 |
|---|---|---|---|---|---|
| (A) 312 | 2003/12/01 12:00:00 | 00:00:00 | 2003/12/01 12:00:00 | 2003/12/01 11:58:30 | +00:01:30 |
| (B) 314 | 2003/12/01 12:00:00 | 00:02:00 | 2003/12/01 12:02:00 | 2003/12/01 12:00:30 | +00:01:30 |
| (C) 316 | 2003/12/01 12:00:00 | 01:00:00 | 2003/12/01 13:00:00 | 2003/12/01 12:28:30 | +00:31:30 |
| (D) 318 | 2003/12/01 12:00:00 | 02:00:00 | 2003/12/01 14:00:00 | 2003/12/01 13:28:30 | +00:31:30 |

ESTIMATION OF TIME WITHIN UNTRUSTED TIME DEVICE DISCONNECTED FROM TRUSTED TIME DEVICE

FIELD OF THE INVENTION

The present invention relates to determining time within an untrusted time device, particularly when the untrusted time device has been disconnected from a trusted time device, for purposes such as controlling the use of digital content having a limited-use period.

BACKGROUND OF THE INVENTION

Digital rights management (DRM) encompasses schemes for protecting the copyrights of digital content that is typically distributed online. Such digital content may include multimedia content, such as audio and/or video, as well as digital versions of books, magazines, and periodicals. One common type of DRM scheme is to enable access to digital content for a limited-use period. After the period has expired, the digital content is no longer accessible.

Typically a user of a device, such as a general-purpose computer or a special-purpose device like a music playing device, downloads content from a server over a network, like the Internet. The content may have an expiration date, such that it is accessible by the user for a period of limited use. The device thus has to track time including the time when the content was downloaded, and the length of time that has elapsed since the content was downloaded, in order to determine if the limited-use period has expired.

The device of the user can be referred to as an untrusted time device, because the owner or manager of the content that is permitting the content to be downloaded into the device does not control the internal system clock of the device, and cannot guarantee that the device will maintain reliable timekeeping. For instance, given content may have an expiration date of seven days from the date it was downloaded. To improperly extend the period of time in which the user can access the content, the user may repeatedly set back the system clock of the device, so that it appears that the content has not expired. Because the owner or manager of the content cannot control the internal system clock of the device, the device is thus an untrusted time device.

To avoid such scenarios in which the system clock of an untrusted time device is manipulated to circumvent DRM for content, the prior art provides for a number of solutions that the owner of manager of the content may employ. First, the content may not be accessed by the user at the untrusted time device unless this device is communicatively connected to a trusted time device. A trusted time device can be a device that is controlled by the owner or manager of the content, such that it can be guaranteed that the device will maintain reliable timekeeping. The trusted time device may be communicatively connectable to the untrusted time device over a network, such as the Internet, or a wired or wireless telephony network, like a cellular phone network.

Requiring that the content be accessible by the user only when the untrusted time device is communicatively connected to the trusted time device is burdensome and can severely restrict honest usage of the content. For example, in the case of a portable music playing device, requiring that the device be communicatively connected to the trusted time device for access of the content means that the content cannot be played while the user is jogging, is on an airplane, and so on. This prior art solution is thus untenable.

Another prior art solution is to detect when the internal system clock of the untrusted time device has been rolled back to a previous time, and not permit access of the content at the device until connection has been reestablished with the trusted time server. However, not all manipulations of the internal system clock of the untrusted time device by the user are malicious. The user may have changed time zones, for instance, requiring him or her to change the system clock of the device, or the user may be correcting minor errors in the time being kept by the clock. Therefore, such legitimate clock manipulations causing the inaccessibility of content can be inconvenient and frustrating for the user, resulting in this prior art solution to be untenable as well.

SUMMARY OF THE INVENTION

The invention relates to estimating time within an untrusted time device that has been communicatively disconnected from a trusted time device. A method of the invention is performable by the untrusted time device. Upon communicatively connecting to a trusted time device, the untrusted time device: (a) acquires a trusted current time from the trusted time device; (b) stores an elapsed time that is elapsed from the trusted current time; (c) determines an estimated current time based on the trusted current time and the elapsed time; and, (d) stores a time difference between the estimated current time and an untrusted current time of the untrusted time device. Furthermore, the untrusted time device (e) repeats (b)-(d) until the untrusted time device has been turned off. Upon the untrusted time being turned on again, if the untrusted time device is able to communicatively connect to the trusted time device, then the untrusted time device (f) repeats (a)-(e).

If the untrusted time device is unable to communicatively connect to the trusted time device, then the untrusted time device: (g) determines a temporary current time based on the time difference last stored in (d) and the untrusted current time of the untrusted time device; and, (h) compares the estimated current time last determined in (c) with the temporary current time. Furthermore, the untrusted time device, (i) where the estimated current time last determined in (c) is less than the temporary current time, sets an offline current time equal to the temporary current time. The untrusted time device, (j) where the estimated current time last determined in (c) is greater than the temporary current time, sets the offline current time equal to the estimated current time last determined in (c). In either (i) or (j), the untrusted time device may further reset the elapsed time. Furthermore, in (j), the untrusted time device may prevent use of digital content associated with the trusted time device, at the untrusted time device.

A system of the invention includes a network, a trusted time device, and an untrusted time device. The trusted time device is communicatively connectable to the network, and provides a trusted current time. The untrusted time device is communicatively connectable to the network,. and provides an untrusted current time. When the untrusted time device is communicatively coupled to the network, it utilizes as an online current time the trusted current time from the trusted time device plus an elapsed time, and maintains a time difference between the online current time and the untrusted current time.

When the untrusted time device is not communicatively coupled to the network, it utilizes as an offline current time the untrusted current time plus the time difference last maintained, where the online current time last utilized is less than the untrusted current time plus the time difference last maintained. The untrusted time device otherwise utilizes as the offline current time the online current time last utilized, where the online current time last utilized is greater than the untrusted time plus the time difference last maintained. When the untrusted time device is not communicatively coupled to the network, and where the online current time last utilized is greater than the untrusted current time plus the time difference last maintained, the untrusted time device may prevent use of digital content associated with the trusted time device.

An article of manufacture of the invention includes a computer-readable medium and means in the medium. The medium may be a recordable data storage medium, a modulated carrier signal, or another type of computer-readable medium. The means is for determining an online current time when an untrusted time device is communicatively connected to a trusted time device, and is for determining an offline current time when the untrusted time device is not communicatively connected to the trusted time device. The online current time is determined as a trusted current time from the trusted time device plus an elapsed time.

The offline current time is determined as the untrusted current time plus a time difference, where the online current time last determined is less than an untrusted current time of the untrusted time device plus the predetermined time difference. The offline current time is further determined as the online current time last determined where the online current time last determined is greater than the untrusted current time plus the time difference. The means may further by for prevent use of digital content associated with the trusted time device, at the untrusted time device, when the untrusted time device is not communicatively connected to the trusted time device, and when the online current time last determined is greater than the untrusted current time plus the time difference.

Embodiments of the invention provide for advantages over the prior art. Unlike the prior art, digital content may be used even when the untrusted time device is not communicatively connected to the trusted time device. Furthermore, legitimate and/or minor manipulations of the internal system clock of the untrusted time device do not necessarily prevent usage of the digital content at the untrusted time device. For instance, upon acquiring the trusted current time from the trusted time device, the untrusted time device may reset a warning count and a critical count. The warning count denotes a number of times that the untrusted time device was unable to acquire the trusted current time upon being turned back on, and that the estimated current time last determined in (c) was less than the temporary current time. The critical count denotes a number of times that the untrusted time device was unable to acquire the trusted current time upon being turned back on, and that the estimated current time last determined in (c) was greater than the temporary current time.

When the estimated current time last determined in (c) last determined is less than the temporary current time, the warning count is incremented, whereas when the estimated current time last determined in (c) last determined is greater than the temporary current time, the critical count is incremented. If the warning count is greater than a predetermined threshold, such as five, use of the digital content is prevented at the untrusted time device until the untrusted time device is reconnected with the trusted time device. Thus, minor manipulations of the system clock of the untrusted time device do not automatically result in loss of access to the digital content at the untrusted time device. If the critical count is greater than a predetermined threshold, such as zero, use of the digital content is likewise prevented at the untrusted time device until it is reconnected with the trusted time device. Thus, major and/or malicious manipulations of the system clock of the untrusted time device more quickly result in loss of access to the digital content at the untrusted time device.

Other aspects and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Example Usage Scenarios

Figure 1A:
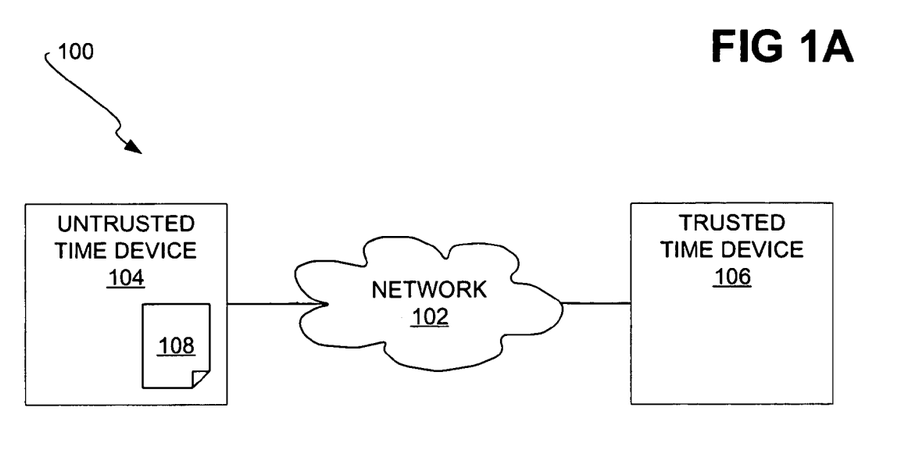
FIGS. 1A and 1B are diagrams depicting example scenarios in which an untrusted time device is communicatively connected to a trusted time device, according to an embodiment of the invention.
Figure 1B:
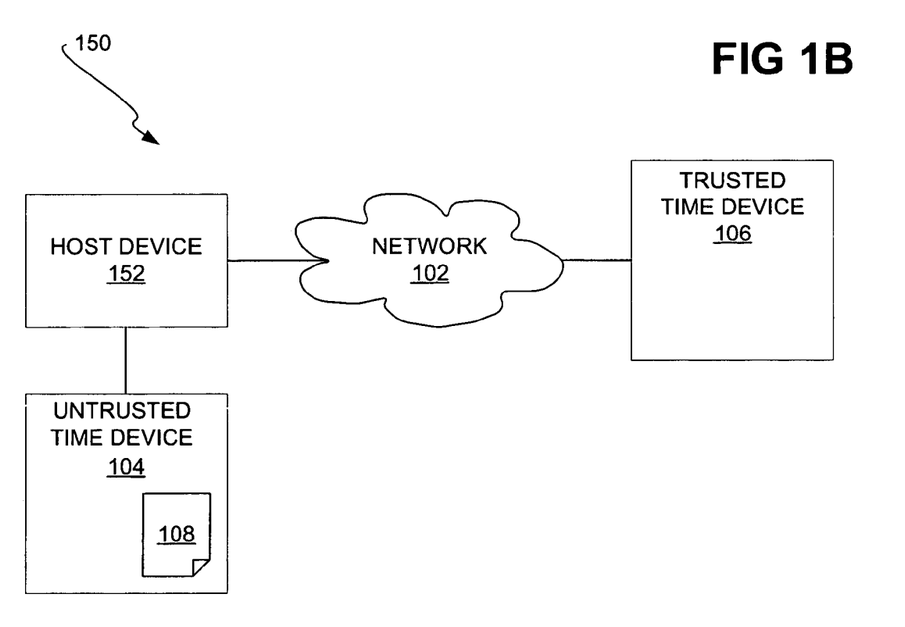

FIGS. 1A and B show example usage scenarios 100 and 150 in which an untrusted time device 104 and a trusted time device 106 are communicatively connected to one another via a network 102, according to an embodiment of the invention. The difference between the scenario 100 of FIG. 1A and the scenario 150 of FIG. 1B is that in the former scenario 100, the untrusted time device 104 is directly connected to the network 102, whereas in the latter scenario 102, the untrusted time device 104 is connected to the network 102 through a host device 152. The network 102 may be or include one or more of: the Internet, an intranet, an extranet, a wired network, a wireless network, a cellular network, a telephony network, and so on.

The trusted time device 106 may be a computing device, such as a server computing device, that maintains trusted time. For instance, the trusted time device 106 may be managed and/or owned by a digital content provider, such that the trusted time device 106 has an internal system clock maintaining time that can be considered as reliable from the perspective of the digital content provider. The untrusted time device 104 may also be a computing device, such as a desktop or a laptop computing device, or a more specialized device, like a music playing device, and so on. The untrusted time device 104 maintains untrusted time. For instance, a digital content provider typically does not manage or own the untrusted time device 104, such that the digital content provider cannot necessarily consider the time maintained by the internal system clock of the trusted time device 106 as reliable. Rather, the untrusted time device 104 is usually owned or managed by an end user, who may be able to manipulate the time of the internal system clock.

The untrusted time device 104 has downloaded thereto digital content 108. The digital content 108 is associated with the trusted time device 106 in that the trusted time maintained by the trusted time device 106 determines whether or not the untrusted time device 104 is able to continue permitting access to the digital content 108. The digital content 108 may be multimedia content, such as audio and/or video, as well as digitized textual and graphics content, such as digitized magazines, periodicals, books, and so on. The untrusted time device 104 may have downloaded the digital content 108 from the trusted time device 106 over the network 102, or from another device or server over the network 102. The digital content 108 has an expiration date, such that it is accessible during a limited-use period at the untrusted time device 104. Once the expiration date has been reached, such that the limited-use period has expired, the digital content 108 is preferably no longer accessible at the untrusted time device 104. Therefore, the digital content 108 can be considered as having its use or access managed via a digital rights management (DRM) scheme.

In the scenario 150 of FIG. 1B, the host device 152 may also be a computing device like a desktop, notebook, or laptop computer, or another type of computing device. The host device 152 is a host to the untrusted time device 104. Thus, the untrusted time device 104 is able to receive the digital content 108 from over the network 102 through the host device 152, and able to otherwise communicate with the trusted time device 106 over the network 102 through the host device 152. The untrusted time device 104 in this embodiment may particularly be a special-purpose portable device, like a music playing device, that is periodically docked or connected to the host device 152 for purposes of receiving new digital content, and so on.

Figure 2A:
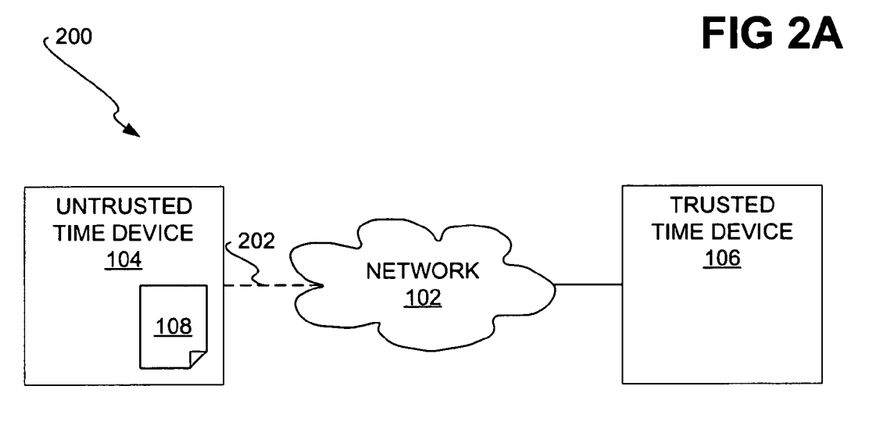
FIGS. 2A and 2B are diagrams depicting example scenarios in which an untrusted time device is communicatively disconnected from a trusted time device, according to an embodiment of the invention.
Figure 2B:
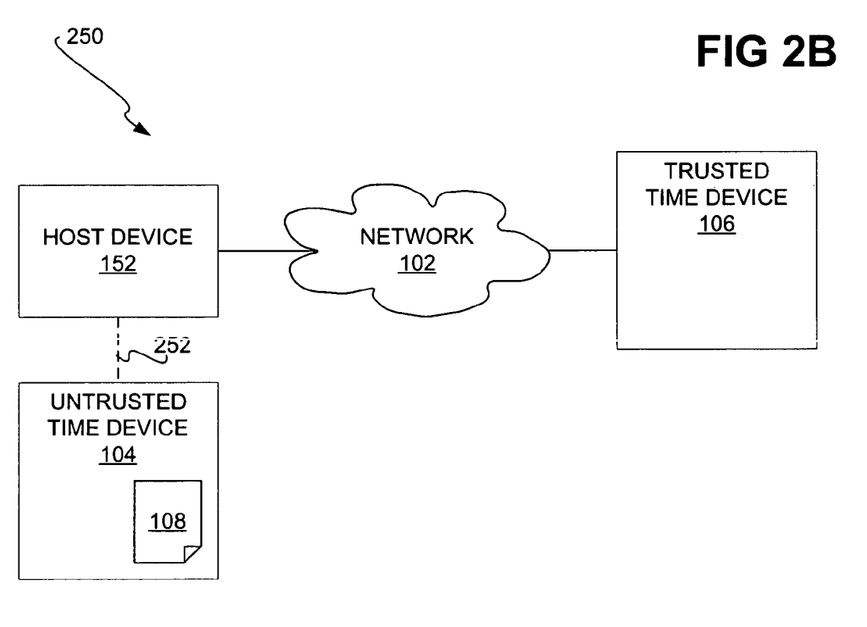

FIGS. 2A and 2B show example usage scenarios 200 and 250 in which the untrusted time device 104 and the trusted time device 106 are communicatively disconnected from one another, according to an embodiment of the invention. In the scenario 200 of FIG. 2A, the untrusted time device 104, with its digital content 108, is no longer communicatively connected to the network 102, as indicated by the dotted line 202. As such, it is no longer connected to the trusted time device 106 over the network 102. In the scenario 250 of FIG. 2B, the untrusted time device 104, with its digital content 108, is no longer communicatively connected to the host device 152, as indicated by the dotted line 252. As such, it is no longer connected to the trusted time device 106 over the network 102.

Maintenance of Time Examples

Figure 3:
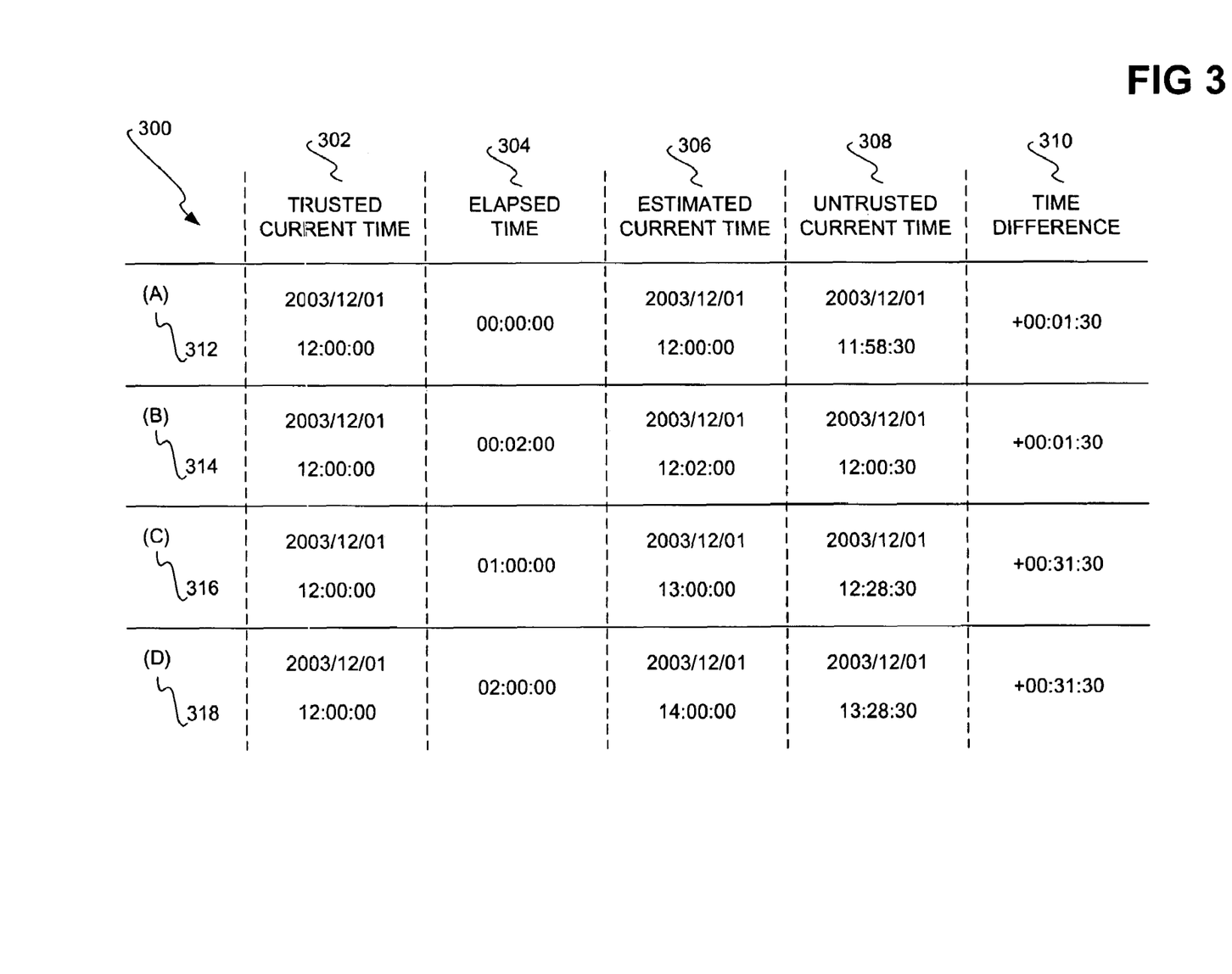
FIG. 3 is a diagram illustrating an example of the maintenance of time at an untrusted time device when it is communicatively connected to a trusted time device, according to an embodiment of the invention.

FIG. 3 shows an example scenario 300 in which time is maintained at the untrusted time device 104 when it is communicatively connected to the trusted time device 106, as in the scenario 100 of FIG. 1A or in the scenario 150 of FIG. 1B, according to an embodiment of the invention. There are five different types of time maintained in the scenario 300: trusted current time, indicated by the reference number 302; elapsed time, indicated by the reference number 304; estimated current time, indicated by the reference number 306; untrusted current time, indicated by the reference number 308; and, a time difference, indicated by the reference number 310. Furthermore, there are four different examples points in time in which these five different types of time are depicted in the example scenario 300, as denoted by the letters (A), (B), (C), and (D), as well as the reference numbers 312, 314, 316, and 318, respectively.

The trusted current time is the time that is maintained by the trusted time device 106, and is obtained or acquired by the untrusted time device 104 over the network 102. Thus, it is the most reliable time within the scenario 300. The elapsed time is the time that has elapsed since the acquisition of the trusted current time, and is accumulated or measured by a process running on the untrusted time device 104. The estimated current time is the assumed current time, and is calculated as the trusted current time plus the elapsed time. The untrusted current time is the local time at or of the untrusted time device 104, and thus is the time indicated by the local system lock of the untrusted time device 104, and which may be able to be freely changed by the user of the device 104. Finally, the time difference is the difference in time, or error, between the estimated current time and the untrusted current time, and is calculated by a process running on the untrusted time device 104.

At the point in time indicated by the letter (A) and the reference number 312, the untrusted time device 104 has communicatively connected to the trusted time device 106, and has acquired the trusted current time from the trusted time device 106 as 2003/12/01 12:00:00. At this point in time, the untrusted time device resets the elapsed time to 00:00:00. Furthermore, the untrusted time device may clear a warning count and a critical count, as are described in more detail later in the detailed description. The estimated current time is equal to the trusted current time plus the elapsed time, and thus is equal to 2003/12/01 12:00:00. The untrusted current time is the local time of the local system clock of the untrusted time device 104, such as 2003/12/01 11:58:30. The time difference is the difference between the estimated current time and the untrusted current time, which in this case is +00:01:30.

At the point in time indicated by the letter (B) and the reference number 314, two minutes have passed since the point in time indicated by the letter (A) and the reference number 312. The trusted current time remains the same, but the elapsed time is now 00:02:00, so that the estimated current time is now 2003/12/01 12:02:00. The untrusted current time has also increased by two minutes, to 2003/12/01 12:00:30, so that the time difference remains at +00:01:30, as the difference between the estimated current time and the untrusted current time.

At the point in time indicated by the letter (C) and the reference number 316, one hour has passed since the point in time indicated by the letter (A) and the reference number 312.

However, the user of the untrusted time device 104 has set back the local system clock of the untrusted time device by thirty minutes. The trusted current time remains the same, while the elapsed time is now 01:00:00, making the estimated current time 2003/12/01 13:00:00. As has been indicated, the local system clock has been set back by thirty minutes, so the untrusted current time is now 2003/12/01 12:28:30. The time difference between the estimated current time and the untrusted current time thus increases by thirty minutes, to +00:31:30.

At the point in time indicated by the letter (D) and the reference number 318, two hours have passed since the point in time indicated by the letter (A) and the reference number 312. Furthermore, the user disconnects the untrusted time device 104 from the network 102, such that the untrusted time device 104 is no longer communicatively connected to the trusted time device 106, and/or the user turns off the untrusted time device 104, after the passage of the point in time indicated by the letter (D) and the reference number 318. The trusted current time remains the same, and the elapsed time is now 02:00:00, making the estimated current time 2003/12/01 14:00. The untrusted current time is now 2003/12/01 13:28:30, so the time difference remains +00:31:30, as the difference between the estimated current time and the untrusted current time. For the purposes of the example scenario 300, the times associated with the point in time indicated by the letter (D) and the reference number 318 are the last or most recent times at which the untrusted time device 104 is communicatively connected to the trusted time device 106.

Figure 4A:
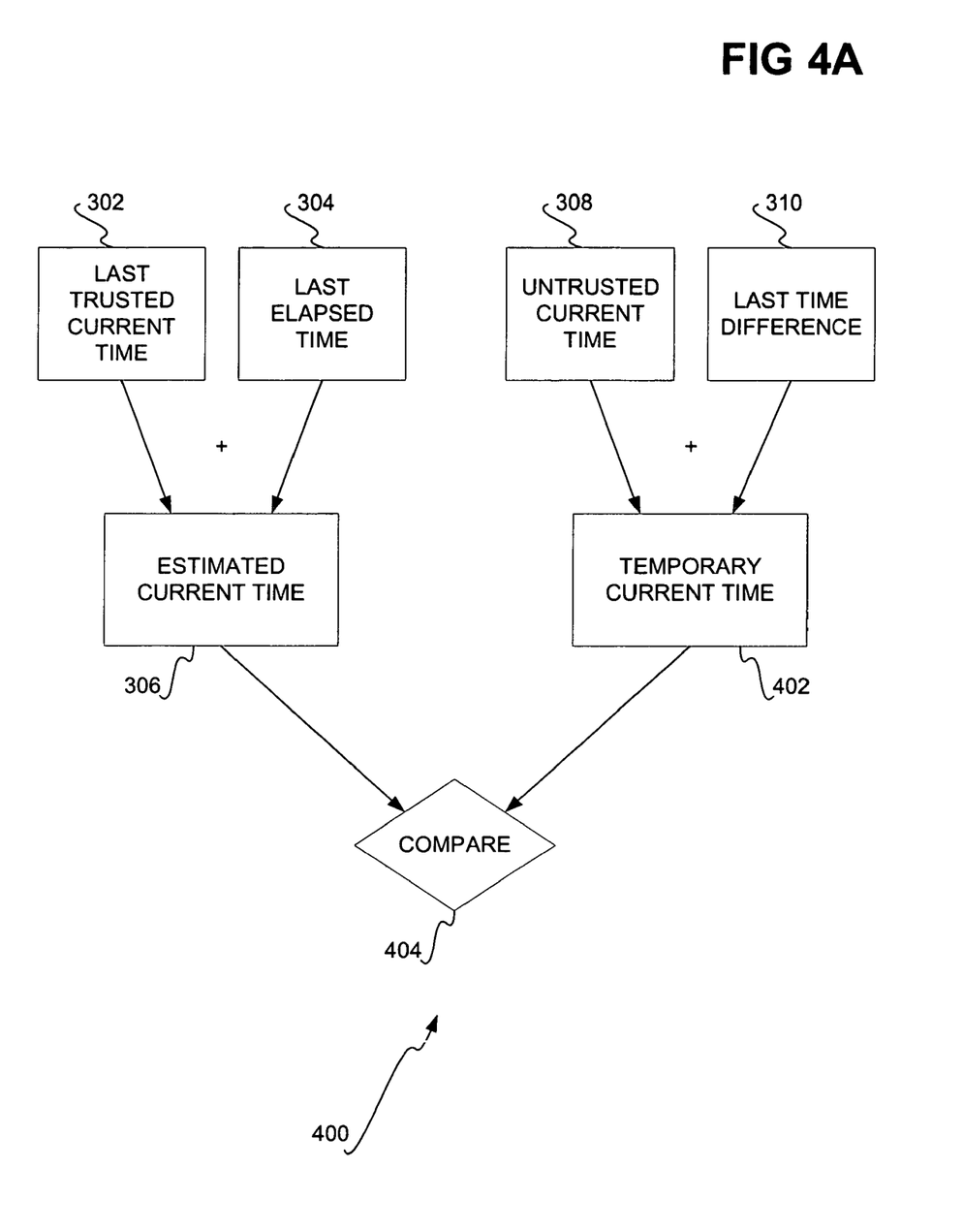
FIGS. 4A and 4B are diagrams illustrating an example of the maintenance of time at an untrusted time device when it is communicatively disconnected from a trusted time device, according to an embodiment of the invention.
Figure 4B:
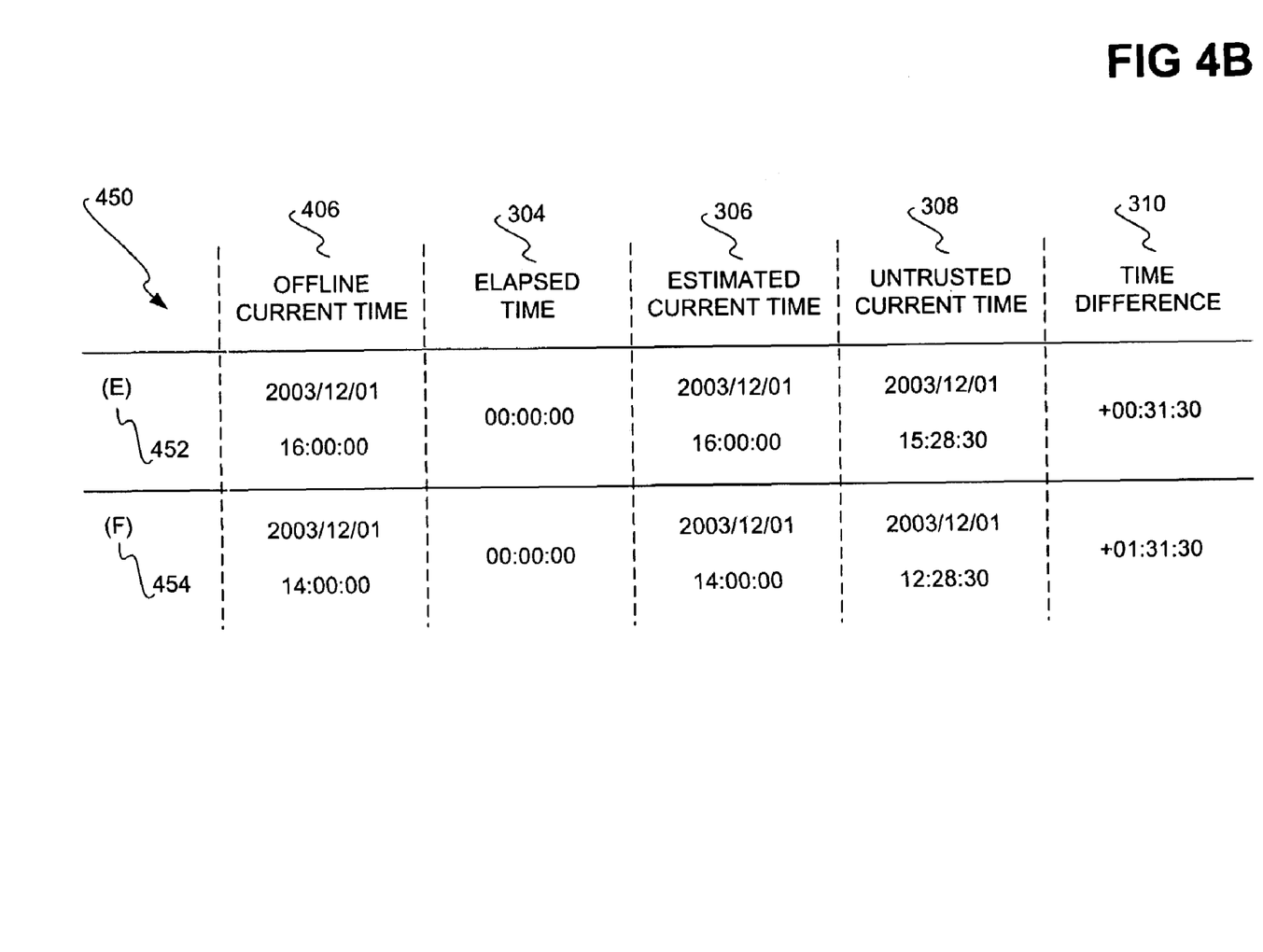

FIGS. 4A and 4B show example scenarios 400 and 450 in which time is maintained at the untrusted time device 104 when it has been communicatively disconnected from the trusted time device 106, as in the scenario 200 of FIG. 2A or in the scenario 250 of FIG. 2B, according to an embodiment of the invention. For instance, after having been turned off, the untrusted time device 104 may be disconnected from the trusted time device 106, and then turned back on. The example scenarios 400 and 450 presume that four hours have elapsed since the trusted current time was acquired at the point in time indicated by the letter (A) and the reference number 312 of FIG. 3, or two hours since the point in time indicated by the letter (D) and the reference number 318 of FIG. 3.

When the untrusted time device 104 determines that it no longer is connected to the trusted time device 106, it performs the time calculations depicted in FIG. 4A. The last trusted current time 302 is the trusted current time that was last obtained or acquired from the trusted time device 106, such as the time 2003/12/01 12:00:00, when the trusted time device 106 and the untrusted time device 104 were communicatively connected, at the point indicated by the letter (D) and the reference number 318 of FIG. 3. The last elapsed time 304 is the last elapsed time when the trusted time device 106 and the untrusted time device 104 were communicatively connected, at the point in time indicated by the letter (D) and the reference number 318 of FIG. 3, or 02:00:00. The estimated current time 306 is thus equal to 2003/12/01 14:00:00, as the sum of the last trusted current time 302 and the elapsed time 304.

The untrusted current time 308 is current local time at the untrusted time device 104, and assuming that no further manipulations thereof have occurred, is 2003/12/01 15:28:30, or two hours past the untrusted current time at the point in time indicated by the letter (D) and the reference number 318 of FIG. 3. The last time difference 310 is the time difference that was last determined when the trusted time device 106 and the untrusted time device 104 were communicatively connected, at the point in time indicated by the letter (D) and the reference number 318, or +00:31:30. The temporary current time 402 is the sum of the untrusted current time 308 and the last time difference 310, or 2003/12/01 16:00:00.

Next, as indicated by the comparison diamond 404, the untrusted time device 104 compares the estimated current time 306 with the temporary current time 402. Referring to FIG. 4B, if the estimated current time 306 is less than the temporary current time 402, then the various types of time indicated in FIG. 4B are set in accordance with the letter (E) and the reference number 452. If the estimated current time 306 is greater than the temporary current time 402, then the various types of time indicated in FIG. 4B are set in accordance with the letter (F) and the reference number 454. The various types of time indicated in FIG. 4B are the same as those indicated in FIG. 3 and included elapsed time 304, estimated current time 306, untrusted current time 308, and time difference 310, except that there is no trusted current time 302 in FIG. 4B, since the untrusted time device 104 is not communicatively connected to the trusted time device 106. Instead, there is an offline current time 406, which is used as the trusted current time until the untrusted time device 104 is communicatively connected again with the trusted time device 106.

Where the estimated current time 306 of FIG. 4A is 2003/12/01 14:00:00 and the temporary current time 402 of FIG. 4A is 2003/12/01 16:00:00, then the various types of time indicated in FIG. 4B are set in accordance with the letter (E) and the reference number 452. The offline current time is set as the temporary current time 402 of FIG. 4A, and thus is equal to 2003/12/01 16:00:00, and it is concluded that the untrusted current time 308 has not been significantly tampered with by the user. The elapsed time is reset, and the estimated current time begins at 2003/12/01 16:00:00. The untrusted current time is 2003/12/01 15:28:30, making the time difference between the estimated current time and the untrusted current time as +00:31:30. A warning count may be incremented to indicate that the trusted time from the trusted time device 106 is not being used, and the user may be displayed a warning message indicating that the user should connect to the trusted time device 106 as soon as possible. If the warning count exceeds a threshold, such as two or five, utilization of the digital content may not be permitted at the untrusted time device 104 until connection is reestablished with the trusted time device 106.

However, assume that the estimated current time 306 of FIG. 4A is 2003/12/01 14:00:00, but that the temporary current time 402 of FIG. 4A is instead 2003/12/01 13:00:00, owing to the user having set the time back on the internal system clock of the untrusted time device 104 to 12:28:30. Thus, the estimated current time 306 is greater than the temporary current time 402, and the various types of times indicated in FIG. 4B are set in accordance with the letter (F) and the reference number 454. The offline current time is set as the estimated current time 306 of FIG. 4A, or 2003/12/01 14:00:00, and it is concluded that the untrusted current time 308 has been significantly tampered with by the user. The elapsed time is reset, and the estimated current time beings at 2003/12/01 14:00:00. The untrusted current time is 2003/12/01 12:28:30, making the time difference between the estimated current time and the untrusted current time as +01:31:30. A critical count may be incremented to indicate that potential tampering of the internal system clock of the untrusted time device 104 has occurred, and the user may be displayed a message indicating that the user should connect to the trusted time device 106 immediately. If the critical count exceeds a threshold, such as one, utilization of the digital content may not be permitted at the untrusted time device 104 until connection is reestablished with the trusted time device 106.

Methods

Figure 5:
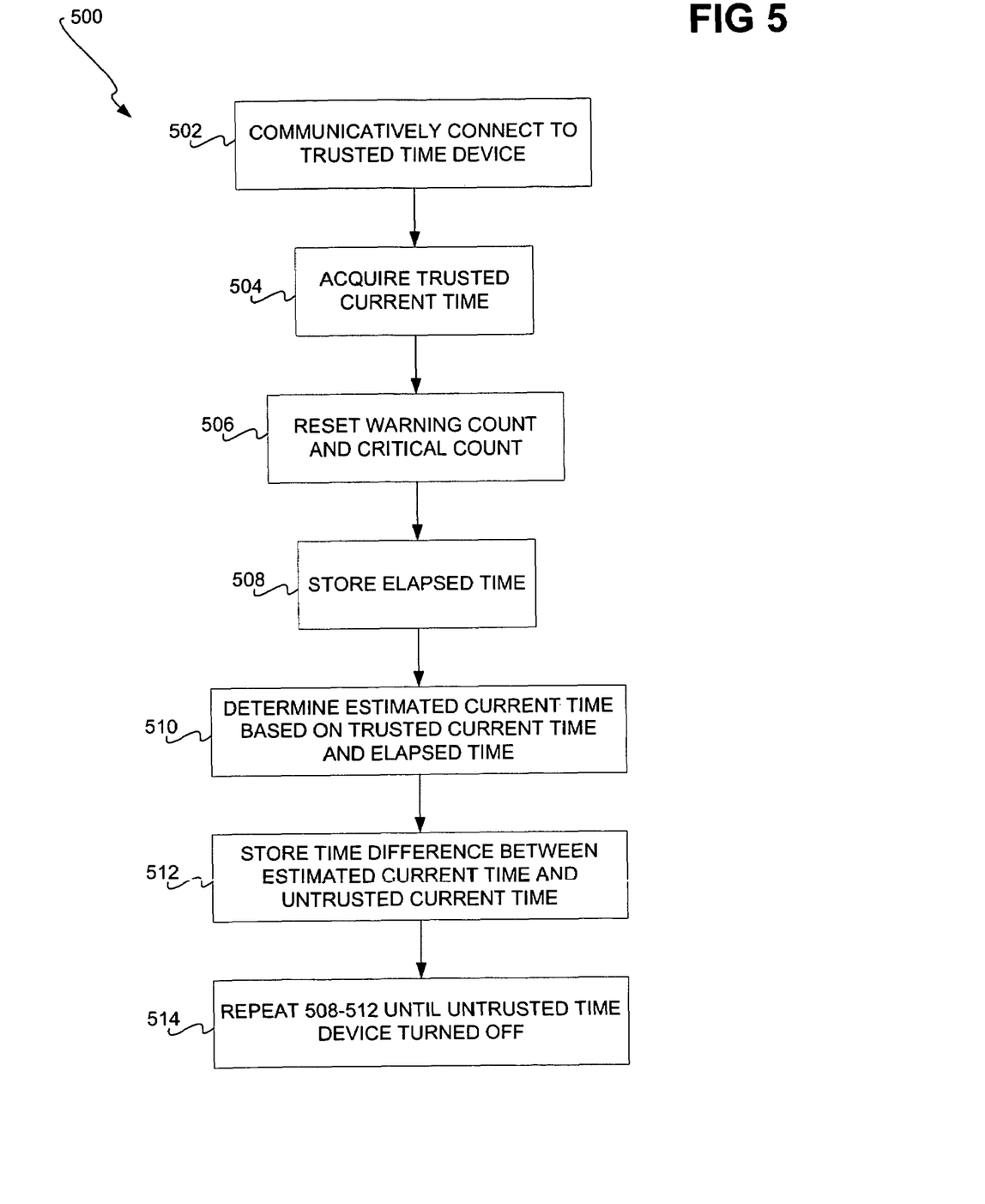
FIG. 5 is a flowchart of a method for maintaining time at an untrusted time device when it is communicatively connected to a trusted time device, according to an embodiment of the invention.

FIG. 5 is a flowchart of a method 500 that is performable by the untrusted time device 104 when the untrusted time device 104 is communicatively connected with the trusted time device 106, according to an embodiment of the invention. Performance of the method 500 can result in the example scenario 300 of FIG. 3, for instance. The method 500 may be implemented as one or more computer programs of a computer-readable medium of the untrusted time device 104, such as a recordable data storage medium, a modulated carrier signal, and so on.

The untrusted time device 104 communicatively connects with the trusted time device 106 (502). Thereafter, the untrusted time device 104 acquires the trusted current time from the trusted time device 106 (504), and resets the warning and critical counts (506). The elapsed time, elapsed from the trusted current time, is also stored at the untrusted time device 104 (508). The untrusted time device 104 determines the estimated current time based on the trusted current time and the elapsed time (510), adding the trusted current time and the elapsed time to yield the estimated current time. The untrusted time device 104 further stores the difference between the estimated current time and the untrusted current time of the untrusted time device 104 (512). 508, 510, and 512 are repeated until the untrusted time device has been turned off (514).

Figure 6:
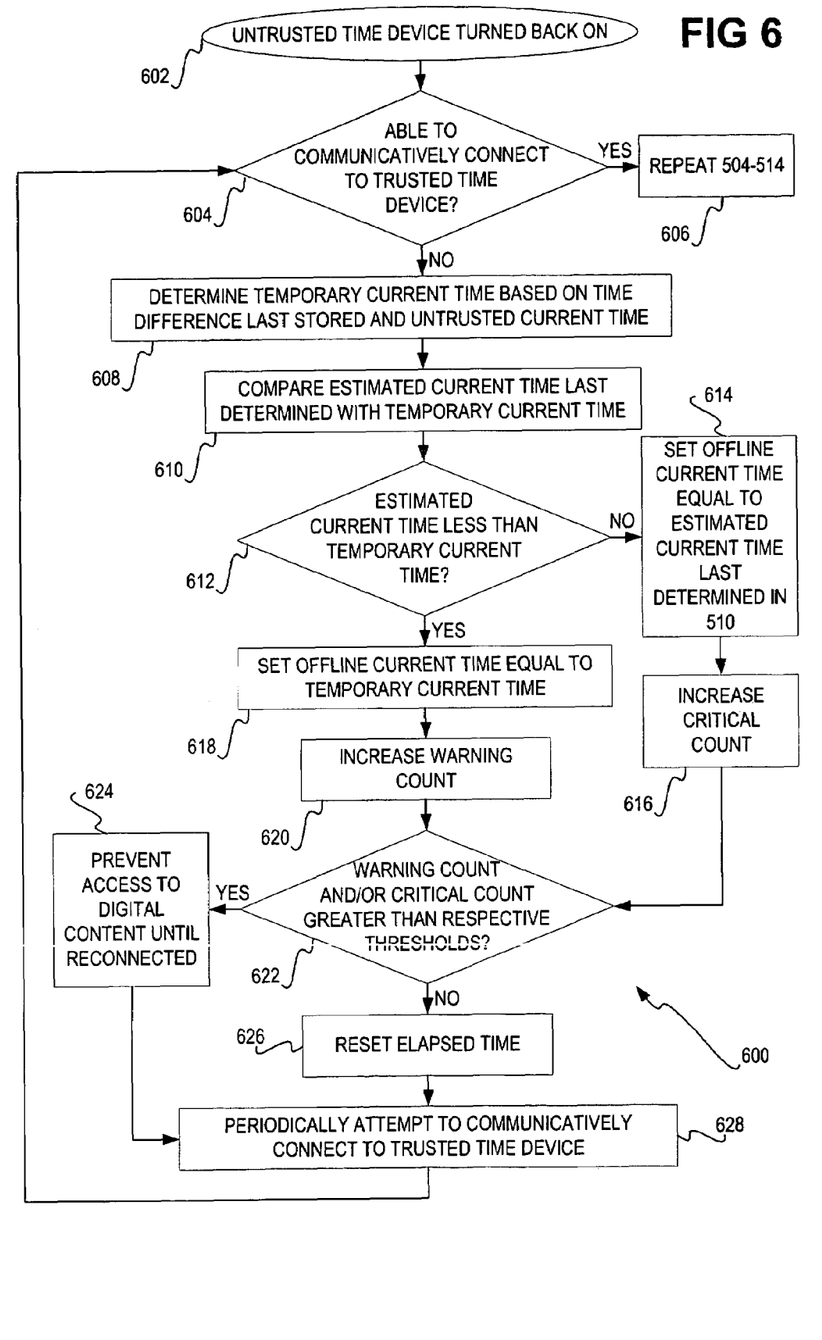
FIG. 6 is a flowchart of a method for maintaining time at an untrusted time device when it is communicatively disconnected from a trusted time device, according to an embodiment of the invention.

FIG. 6 is a flowchart of a method 600 that is performable by the untrusted time device 104 when the untrusted time device 104 is turned on after having been communicatively connected with the trusted time device 106, according to an embodiment of the invention. Performance of the method 600 can result in the example scenarios 400 and 450 of FIGS. 4A and 4B, for instance. The method 600 may be implemented as one or more computer programs of a computer-readable medium of the untrusted time device 104, such as a recordable data storage medium, a modulated carrier signal, and so on.

The untrusted time device 104 is thus turned back on (602). If it is able to communicatively connect to the trusted time device 106 (604), then 504, 506, 508, 510, 512, and 514 of the method 500 of FIG. 5 are repeated (606). Otherwise, the untrusted time device 104 determines a temporary current time based on the time difference last stored in 512 of the method 500 of FIG. 5 and the untrusted current time (608), by adding the time difference last stored in 512 of the method 500 to the untrusted current time. Next, the untrusted time device 104 compares the estimated current time last determined in 510 of the method 500 of FIG. 5 with the temporary current time (610).

If the estimated current time last determined in 510 of the method 500 of FIG. 5 is not less than the temporary current time (612), then an offline current time is set equal to the estimated current time last determined in 510 of the method 500 (614), and the critical count is incremented (616). Otherwise, the offline current time is set equal to the temporary current time (618), and the warning count is incremented (620). In either case, if the warning count and/or the critical count is greater than their respective thresholds (622), then the untrusted time device 104 prevents access to the digital content until reconnection with the trusted time device 106 (624). Otherwise, the elapsed time is reset (626). The untrusted time device 104 periodically attempts to communicatively connect to the trusted time device 106 (628), and the method 600 repeats at 604.

CONCLUSION

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. It is manifestly intended that this invention be limited only by the claims and equivalents thereof.

I claim:

1. A method performable by an untrusted time device comprising:
   upon communicatively connecting to a trusted time device,
      (a) acquiring a trusted current time from the trusted time device;
      (b) storing an elapsed time, elapsed from the trusted current time;
      (c) determining an estimated current time based on the trusted current time and the elapsed time;
      (d) storing a time difference between the estimated current time and an untrusted current time of the untrusted time device;
      (e) repeating (b)-(d) until the untrusted time device has been turned off;
   upon the untrusted time device being turned on again,
      where the untrusted time device is able to communicatively connect to the trusted time device, (f) repeating (a)-(e);
      where the untrusted time device is unable to communicatively connect to the trusted time device,
         (g) determining a temporary current time based on the time difference last stored in (d) and the untrusted current time of the untrusted time device;
         (h) comparing the estimated current time last determined in (c) with the temporary current time;
         (i) where the estimated current time last determined in (c) is less than the temporary current time, setting an offline current time equal to the temporary current time; and,
         (j) where the estimated current time last determined in (c) is greater than the temporary current time, setting the offline current time equal to the estimated current time last determined in (c).

2. The method of claim 1, further comprising, where the estimated current time last determined in (c) is less than the temporary current time, resetting the elapsed time.

3. The method of claim 1, further comprising, where the estimated current time last determined in (c) is greater than the temporary current time, resetting the elapsed time.

4. The method of claim 1, further comprising, upon acquiring the trusted current time from the trusted time device, resetting a warning count and a critical count.

5. The method of claim 4, wherein the warning count denotes a number of times that the untrusted time device was unable to acquire the trusted current time from the trusted time device upon the untrusted time device being turned back on after having been turned off, and that the estimated current time last determined in (c) was less than the temporary current time.

6. The method of claim 4, wherein the critical count denotes a number of times that the untrusted time device was unable to acquire the trusted current time from the trusted time device upon the untrusted time device being turned back on after having been turned off, and that the estimated current time last determined in (c) was greater than the temporary current time.

7. The method of claim 4, further comprising, where the estimated current time last determined in (c) is less than the temporary current time, incrementing the warning count.

8. The method of claim 7, further comprising, where the warning count is greater than a predetermined threshold, preventing use of digital content associated with the trusted time device at the untrusted time device.

9. The method of claim 4, further comprising, where the estimated current time last determined in (c) is greater than the temporary current time, incrementing the critical count.

10. The method of claim 9, further comprising, where the critical count is greater than a predetermined threshold, preventing use of digital content associated with the trusted time device at the untrusted time device.

11. The method of claim 1, further comprising, where the estimated current time last determined in (c) is greater than the temporary current time, preventing use of digital content associated with the trusted time device at the untrusted time device.

12. The method of claim 1, where the untrusted time device is unable to communicatively connect to the trusted time device, periodically attempting to communicatively connect to the trusted time device, and when successful, repeating (a)-(e).

13. A system comprising:
a network;
a trusted time device communicatively connectable to the network and providing a trusted current time; and,
an untrusted time device communicatively connectable to the network and providing an untrusted current time,
wherein when the untrusted time device is communicatively coupled to the network, the untrusted time device utilizes as an online current time the trusted current time from the trusted time device plus an elapsed time, and maintains a time difference between the online current time and the untrusted current time, and
wherein when the untrusted time device is not communicatively coupled to the network,
the untrusted time device utilizes as an offline current time the untrusted current time plus the time difference last maintained where the online current time last utilized is less than the untrusted current time plus the time difference last maintained, and
the untrusted time device utilizes as the offline current time the online current time last utilized where the online current time last utilized is greater than the untrusted current time plus the time difference last maintained.

14. The system of claim 13, wherein the untrusted time device maintains a warning count and a critical count that are reset when the untrusted time device is communicatively coupled to the network.

15. The system of claim 14, wherein when the untrusted time device is not communicatively coupled to the network, and where the online current time last utilized is less than the untrusted current time plus the time difference last maintained, increasing the warning count and, where the warning count is greater than a predetermined threshold, preventing use of digital content associated with the trusted time device.

16. The system of claim 14, wherein when the untrusted time device is not communicatively coupled to the network, and where the online current time last utilized is greater than the untrusted current time plus the time difference last maintained, increasing the critical count and, where the critical count is greater than a predetermined threshold, preventing use of digital content associated with the trusted time device.

17. The system of claim 13, wherein when the untrusted time device is not communicatively coupled to the network, and where the online current time last utilized is greater than the untrusted current time plus the time difference last maintained, preventing use of digital content associated with the trusted time device.

18. An article of manufacture comprising:
a computer-readable medium; and,
means in the medium for determining an online current time when an untrusted device is communicatively connected to a trusted time device and for determining an offline current time when the untrusted time device is not communicatively connected to the trusted time device,
wherein the online current time is determined as a trusted current time from the trusted time device plus an elapsed time,
wherein the offline current time is determined as the untrusted current time plus a time difference where the online current time last determined is less than an untrusted current time of the untrusted time device plus the predetermined time difference, and
wherein the offline current time is determined as the online current time last determined where the online current time last determined is greater than the untrusted current time plus the time difference.

19. The article of claim 18, wherein the means in the medium is further for determining the time difference as the online current time minus the untrusted current time, when the untrusted device is communicatively connected to the trusted time device.

20. The article of claim 18, wherein the means in the medium is further for preventing use of digital content associated with the trusted time device, at the untrusted time device, when the untrusted time device is not communicatively connected to the trusted time device and where the online current time last determined is greater than the untrusted current time plus the time difference.

* * * * *